UNITED STATES PATENT OFFICE.

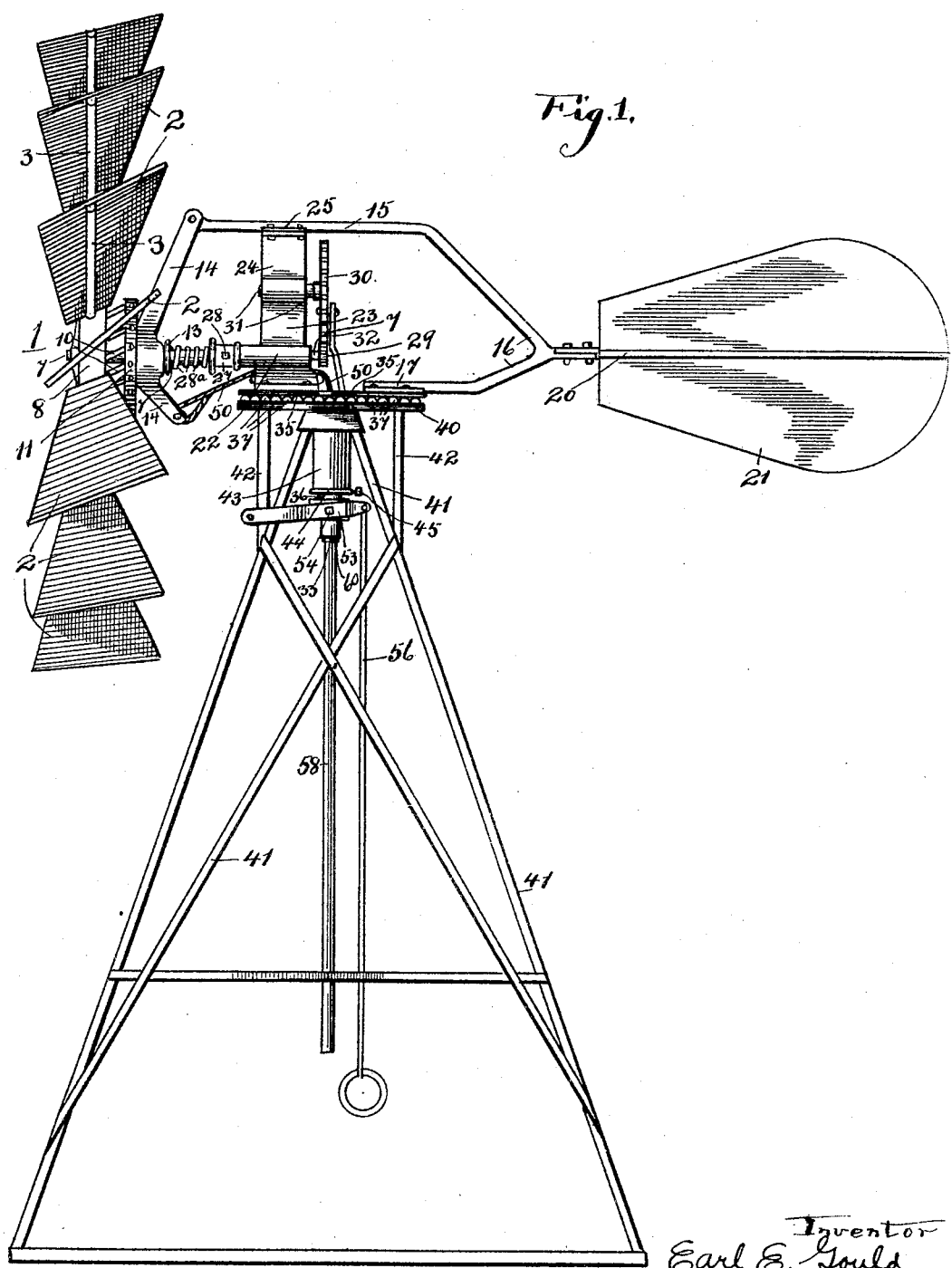

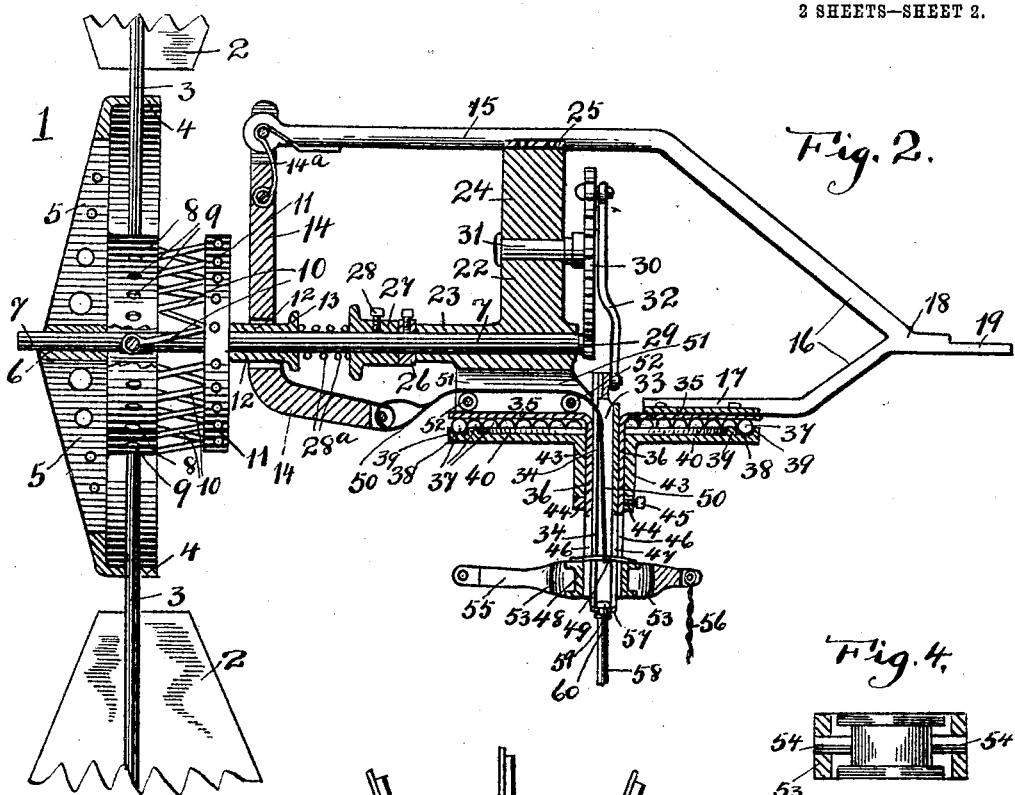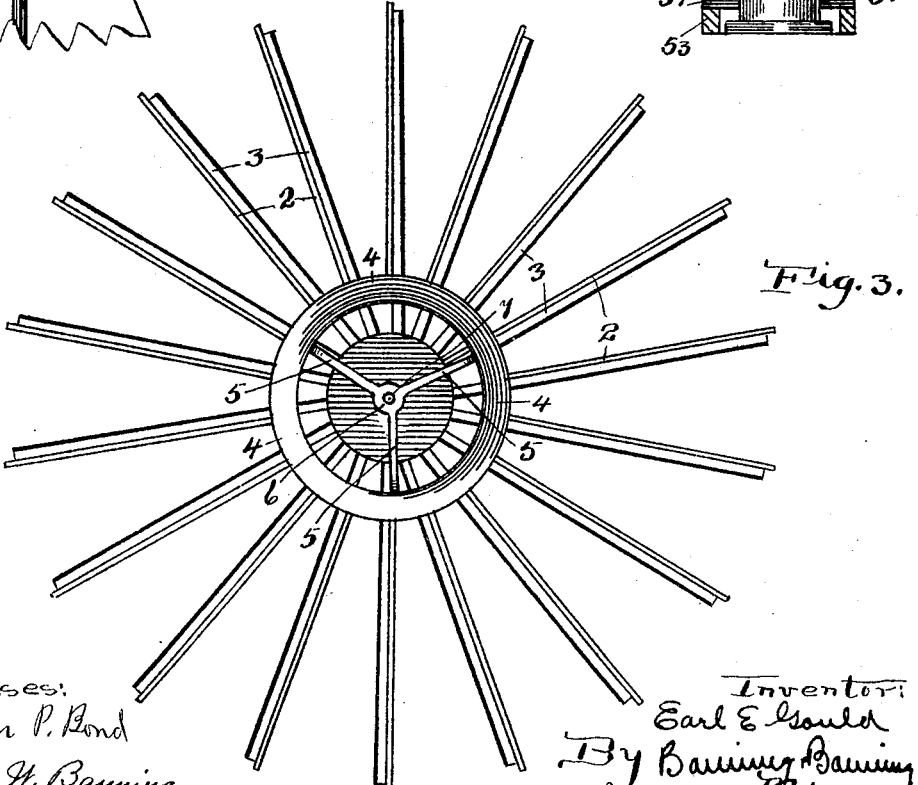

EARL E. GOULD, OF CHICAGO, ILLINOIS.

WINDMILL.

No. 799,598. Specification of Letters Patent. Patented Sept. 12, 1905.

Application filed November 19, 1904. Serial No. 233,437.

*To all whom it may concern:*

Be it known that I, EARL E. GOULD, a citizen of the United States, residing at Chicago, in the county of Cook and State of Illinois, have invented certain new and useful Improvements in Windmills, of which the following is a specification.

This invention has for its object to improve the construction and operation of the windmill as a whole and to improve the construction and operation of the devices for regulating and adjusting the blades with respect to the wind and for throwing the blades out of operative position.

The invention further relates to the means provided for permitting the blades to be automatically turned into edgewise position to the wind when the wind-pressure increases to a dangerous degree and to allow the blades to be adjusted either automatically or by the regulation of suitable mechanism to present a predetermined surface to receive the impact of the wind.

Another object of the invention is to improve the method of mounting the operative mechanism so that the parts will be properly balanced and the weight equally sustained on both sides of the tower, thereby enabling the use of a tower of lighter construction than that ordinarily employed.

Another object of the invention is to so arrange the wheel that it will be strong and durable and adapted to be easily regulated and at the same time easy to construct and assemble.

Another object of the invention is to minimize friction and provide for the easy transmission of power from the wheel to the power-shaft; and the invention consists in the features of construction and combination of parts hereinafter described and claimed.

In the drawings illustrating the invention, Figure 1 is a side elevation of the windmill, showing the blades in operative position; Fig. 2, a side view, partly in section, of the wheel in operative position; Fig. 3, a face view of the wheel in inoperative position, and Fig. 4 a detail of a portion of the regulating mechanism.

The windmill is constructed to have a wheel 1, which consists of a series of blades 2, preferably of metal, and each of the blades is mounted on a rod or shaft 3, the several rods or shafts being radially arranged and passing through an outer rim 4, connected, by means of a series of broad thin spokes or plates 5, with a hub 6. (Best shown in Fig. 2.) The hub is rigidly secured to a journal-shaft 7, upon which is mounted an inner rim or collar 8, which is preferably secured to or formed integral with the spokes 5, radiating from the hub 6, and said collar is provided with a series of holes or openings 9, into which are inserted the inner ends of the rods 3, to the outer ends of which, exterior of the outer rim 4, are secured the blades 2. The blades are fixedly secured to the rods in suitable position to expose a greater superficial area of wind-surface behind the rods or spokes to which they are secured, and the purpose of this arrangement will be hereinafter explained.

Each of the rods or spokes has secured to its inner end an arm 10, and when in normal operative position with the blades turned to an angle of about forty-five degrees all of the arms will extend at an oblique angle to the journal-shaft, as shown in Fig. 1. The free ends of the arms are secured to a movable wheel or collar 11, slidably and rotatably mounted on the shaft, and said wheel or collar is preferably formed integral with a hub 12, having at its rear end a flange 13, and surrounding the hub is an L-shaped arm 14, pivoted at its upper end to a rod 15, which rod terminates in a Y-shaped bracket 16, having a lower arm 17 and a rearwardly-extending stem 18, which is preferably provided with a cut-away or flattened portion 19, to which is bolted a rod or bar 20, having secured thereto a tail 21. A spring $14^a$ is secured to the arm 14, which normally holds the arm away from the flange 13.

The rear end of the shaft passes through a socket 22, provided with a forwardly-extending journal-box 23 and an upright portion 24, to which is bolted the arm 15, which is provided with side flanges 25 for that purpose, and between the end of the journal-box and the flanged hub 13 is a bearing-collar 26, rigidly mounted on the shaft, in front of which is a flanged adjustable collar 27, held in place by a set-screw 28, and said adjustable collar is adapted to bear against and regulate the tension of a spring $28^a$, which encircles the shaft intermediate the hub 13 and the adjustable collar. To the end of the shaft is secured a pinion 29, which is of sufficient size to prevent the removal of the shaft through its journal-box, and said pinion meshes with a gear-wheel 30, mounted on a shaft 31, passing through the upright portion of the socket 22, and said gear-wheel has secured thereto a pitman 32, which pitman at its lower end connects with a split tubular plunger 33, provided with a longitudinally-extending slot or opening 34 on its forward side. The socket 22 is bolted to a flat circular plate 35, provided with a depending tubular sleeve 36, through which passes the plunger 33 and in which said plunger is adapted to reciprocate. The plate 35 rests upon a series of ball-bearings 37, mounted within a runway 38, formed between inner and outer flanges 39 on the upper face of a fixed plate 40, which plate is secured to and supported upon a tower 41, preferably of metallic construction and provided with a series of upright braces 42, which serve to support the plate 40 near its periphery. The fixed plate or platform 40 is provided with an exterior sleeve 43, which incloses the rotatable inner sleeve 36, and the sleeve 36 is held against withdrawal from its mounting by means of a bearing-ring 44, held in place by means of a set-screw 45. The sleeve 36 is provided with oppositely-disposed longitudinally-extending slots 46 in line with the slot 34 in the plunger, and in addition to said slot 34, which preferably extends throughout the entire length of the plunger on one side, the plunger is provided with a second slot 47 of substantially the same length as and coinciding with one of the slots 46 in the surrounding sleeve.

Surrounding the slotted sleeve 36 is a slidable flanged collar 48, having secured to its upper face a transversely-extending connection 49, which is adapted to travel up and down in the slots in the plunger and surrounding sleeve. To the cross connection is secured the end of a cable 50, which passes through the plunger and through an opening or channel 51 in the socket 22 and over rotatably-mounted pulley-wheels 52, and the opposite end of the cable is connected with the L-shaped pivoted arm 14, so that a pull on the cable serves to move and regulate the arm. Surrounding the slidable flanged collar 48 is a yoke 53, provided with oppositely-disposed inwardly-extending studs or pins 54, which enter the groove or channel in the slidable collar and are adapted to move the collar up and down without interfering with its rotation. The yoke 53 terminates at one end in a stem 55, which is pivoted to the upright 42, and to the opposite end of the yoke is secured a chain or cable 56, which depends therefrom and extends to a suitable and convenient position for manipulation by the operator of the windmill.

The slotted pitman terminates at its lower end in a cross-head 57, through which passes a power-shaft 58, provided with an enlarged head 59, and below the cross-head 57 is a collar 60 on the power-shaft, which arrangement reciprocates the power-shaft, but allows the same to be held against rotation as the operative parts of the windmill are moved to meet the wind.

The lower arm 17 of the Y-shaped bracket 16 abuts against and is bolted to the circular plate or disk 35, which arrangement provides a firm and secure connection and support for the tail, said support being in the form of a truss, which serves to strengthen the construction as a whole, and said Y-shaped bracket serves to reinforce and support the bearing-socket 22.

In operation, with the blades of the wheel in operative position, as shown in Fig. 1, the wheel will be revolved and the rotation imparted through the journal-shaft transmitted to the gear-wheel. The rotation of the gear-wheel will be transformed into a reciprocating movement through the medium of the pitman, which serves to reciprocate the plunger, to which the power-shaft is connected. The power-shaft, however, by reason of its connection with the plunger may be held against rotary movement and connected with a pump or other suitable appliance. The spring 28 exerts a tension against the hub 12 of the regulating wheel or collar 11, which normally serves to forwardly project said collar and throw the arms connected therewith into angular relation with respect to the journal-shaft, thereby holding the blades at approximately an angle of forty-five degrees to the wind and to the shaft, which is the angle of greatest efficiency. If the strength of the wind increases to a dangerous degree, the wind-pressure on that portion of the blades which lies to the rear of the rods with which they are connected and which contains the greater superficial area will serve to throw the blades against the tension of the spring 28 more nearly into edgewise relation to the wind, thereby decreasing the wind-surface presented and relieving the wheel from a dangerous degree of pressure. If the wind force be of very high velocity, it may turn the blades completely into edgewise position, thereby reducing the exposed surface to a minimum and relieving the wheel from pressure until the abatement of the wind. This arrangement makes the wheel self-adjustable with respect to the blade-surface exposed, so that the blades themselves will assume the position of greatest efficiency consistent with safety, which is a feature of great importance in the art to which the present invention relates. This feature obviates the necessity for constantly regulating the wheel to meet varying conditions of wind, since the mill may be constantly operated with the assurance that the wheel will automatically adjust itself to meet all changes in wind velocity. At the same time, when it is desirable to stop the action of the wheel for any cause or to regulate the angle of the blades, such stopping or regulation may be effected through the medium of the chain or cable 56, a tension on which will serve to draw back the lower end of the L-shaped arm 14, which draws back the adjusting wheel or collar 11 into the position shown in Fig. 2, thereby simultaneously turning all of the blades into edgewise position with respect to the wind and in a parallel relation to the journal-shaft. The arms are preferably connected to the rods 3 at a slight angle to the plane of the blades, so that when the blades are turned into parallel relation to the journal-shaft the arms will still remain at a slight angle thereto, which arrangement of the arms is important, since if the arms were drawn into parallel relation to the blades they would come to a dead-center with respect to the adjusting wheel or collar 11 and would not be easily drawn back into normal position by the tension of the spring.

The provision of a separate and distinct operating-arm for each of the blades serves to distribute the tension exerted by the cable 56 when downwardly pulled and to simultaneously turn all of the blades by a single movement of the wheel or collar with which the arms are connected.

By slidably mounting the wheel or collar on the shaft the hub of the wind-wheel may be fixedly mounted and the tension necessary to move the operative parts reduced to a minimum. The adjustable collar 27 enables the tension of the spring 28 to be increased or diminished at will, thereby increasing or diminishing the amount of wind-pressure necessary to be exerted to move the blades out of operative position.

By forming the fixed platform and the movable plate in the manner indicated the parts may be readily assembled or disassembled, and at the same time provide a firm, secure, and easy bearing for the movable parts and provide against lateral displacement due to wind-pressure.

By providing means for throwing the blades into edgewise position the tail may be rigidly secured, and this arrangement minimizes the surface exposed to wind-pressure when the wheel is thrown out of operative position and at the same time holds the wheel into the wind at all times, which prevents an uneven pressure of wind against any portion of the windmill structure.

What I regard as new, and desire to secure by Letters Patent, is—

1. In a windmill, the combination of a rigidly-mounted plate, a rotatable plate mounted upon the rigid plate, and an outer sleeve depending from the rigidly-mounted plate, an inner sleeve depending from the rotatable plate and passing through the outer sleeve, and provided in its end with a slot, a collar slidably mounted on the inner sleeve, a cross connection secured to the collar and passing through the slot in the inner sleeve, a reciprocating shaft passing through the inner sleeve, a rotatable shaft, a journal-mounting therefor secured to the rotatable plate, a wheel on the rotatable shaft provided with adjusting-blades, a mechanism for adjusting the blades and a cable connected with the cross connection on the slidable collar for actuating the adjusting mechanism, substantially as described.

2. In a windmill, the combination of a fixed support, a plate revolubly mounted thereon and provided with a depending sleeve slotted near its lower end, a plunger adapted to reciprocate within the sleeve and provided with slots coinciding with the slots in the sleeve, a cross-bar passing through the slots in the sleeve and plunger, a reciprocating shaft connected with the plunger, a yoke adapted to vertically adjust the cross-bar, a rotatable shaft, a journal-mounting for the shaft secured to the revoluble plate, a wheel on the end of the shaft provided with adjustable blades, a mechanism for adjusting the blades, and a cable connected at one end with the cross-bar and adapted to actuate the blade-adjusting mechanism, substantially as described.

3. In a windmill, the combination of a fixed support, a plate revolubly mounted thereon and provided with a depending sleeve slotted near its lower end, a plunger adapted to reciprocate within the sleeve and provided with slots coinciding with the slots in the sleeve, a cross-bar passing through the slots in the sleeve and plunger, a reciprocating shaft connected with the plunger, a yoke adapted to vertically adjust the cross-bar, a rotatable shaft, a journal-mounting for the shaft secured to the revoluble plate, a wheel on the end of the shaft provided with adjustable blades, mechanism for adjusting the blades, a cable connected at one end with the cross-bar and adapted to actuate the blade-adjusting mechanism, and a spring bearing against the blade-adjusting mechanism to hold the blades in normal position, and adapted to be compressed by the retraction of the cable, substantially as described.

4. In a windmill, the combination of a rotatable shaft, a journal-mounting for the shaft, a series of rods outwardly extending from and radially arranged with respect to the shaft, a journal-mounting for the rods rigidly secured to the shaft, inwardly-projecting arms on the ends of the rods, blades on the rods, a regulating ring or wheel slidably and rotatably mounted on the shaft to which all of the arms are pivoted, a spring abutting against and normally outwardly projecting the regulating ring or wheel, a lever for retracting the regulating ring or wheel, an upright connected with the journal-mounting for the shaft, a rod secured near its center to the upright to the forward end of which the lever is pivoted, a tail secured at the rear end of the rod, means for actuating the lever, a vertically-extending shaft, and a gear connection between the rotatable shaft and the vertically-extending shaft, substantially as described.

5. In a windmill, the combination of a rotatable shaft, a journal-mounting therefor, a revoluble plate to which the journal-mounting is secured, a series of rods radially arranged with respect to the shaft, a journal-mounting for the rods rigidly secured to the shaft, blades on the rods, mechanism for turning the rods, a lever adapted to actuate the rod-turning mechanism, an upright secured to the journal-mounting for the shaft, a rod or bar spanning the upright and secured near its center thereto and to the forward end of which rod or bar the lever is pivoted, said rod or bar terminating at its rear end in a Y-shaped bracket provided with a rearwardly-extending stem, and a lower arm connected with the revoluble plate, a tail secured to the stem, and means for actuating the lever, substantially as described.

6. In a windmill, the combination of a rigidly-mounted plate provided in its upper face with a runway, a series of balls in the runway, a rotatable plate mounted upon the balls, and an outer sleeve depending from the rigidly-mounted plate, an inner sleeve depending from the rotatable plate and passing through the outer sleeve and provided in its end with a slot, a collar slidably mounted on the inner sleeve, a cross connection secured to the collar and passing through the slot in the inner sleeve, a reciprocating shaft passing through the inner sleeve, a rotatable shaft, a journal-mounting therefor secured to the revoluble plate, a wheel on the rotatable shaft provided with adjustable blades, mechanism for adjusting the blades, and a cable connected with the cross connection on the slidable collar for actuating the adjusting mechanism, substantially as described.

7. In a windmill, the combination of a fixed support, a plate revolubly mounted thereon and provided with a depending sleeve slotted near its lower end, a plunger adapted to reciprocate within the sleeve and provided with slots coinciding with the slots in the sleeve, a slidable collar mounted on the sleeve and provided with a cross connection passing through the slots in the sleeve and plunger, a reciprocating shaft connected with the plunger, a yoke provided with inwardly-extending studs adapted to vertically adjust the collar, a rotatable shaft, a journal-mounting for the shaft secured to the revoluble plate, a wheel on the end of the shaft provided with adjustable blades, mechanism for adjusting the blades, and a cable connected at one end with the cross connection on the collar and adapted to actuate the blade-adjusting mechanism, substantially as described.

8. In a windmill, the combination of a fixed support, a plate revolubly mounted thereon and provided with a depending sleeve slotted near its lower end, a plunger adapted to reciprocate within the sleeve and provided with slots coinciding with the slots in the sleeve, a slidable collar mounted on the sleeve and provided with a cross connection passing through the slots in the sleeve and plunger, a reciprocating shaft connected with the plunger, a yoke provided with inwardly-extending studs adapted to vertically adjust the collar, a rotatable shaft, a journal-mounting for the shaft secured to the revoluble plate, a wheel on the end of the shaft provided with adjustable blades, mechanism for adjusting the blades, a cable connected at one end with the cross connection on the collar and adapted to actuate the blade-adjusting mechanism, and a spring bearing against the blade-adjusting mechanism to hold the blades in normal position and adapted to be compressed by the retraction of the cable, substantially as described.

9. In a windmill the combination of a plate revolubly mounted, a rotatable shaft, a journal-mounting for the shaft rigidly secured to the revoluble plate, an upright on the journal-mounting, a wheel on the rotatable shaft provided with adjustable blades, mechanism for adjusting the blades, a Y-shaped yoke consisting of a rearwardly-projecting stem, a lower arm secured to the revoluble plate, and an upper arm secured to the upright and forwardly extending therefrom, and a lever pivoted to the forwardly-extending arm and adapted to actuate the blade-adjusting mechanism, substantially as described.

10. In a windmill, the combination of a revoluble mounting, a rotatable shaft, a journal-mounting for the shaft rigidly secured to the revoluble mounting, an upright on the journal-mounting, a wheel on the rotatable shaft provided with adjustable blades, mechanism for adjusting the blades, a Y-shaped yoke consisting of a rearwardly-projecting stem, a lower arm secured to the revoluble plate, and an upper arm secured to the upright and forwardly extending therefrom, and a lever pivoted to the forwardly-extending arm and adapted to actuate the blade-adjusting mechanism, substantially as described.

EARL E. GOULD.

Witnesses:
SAMUEL W. BANNING,
WALKER BANNING.